(12) United States Patent
Cannella et al.

(10) Patent No.: US 9,376,640 B2
(45) Date of Patent: *Jun. 28, 2016

(54) FUEL COMPOSITION

(75) Inventors: William J. Cannella, Orinda, CA (US);
Vittorio Manente, Scania (SE)

(73) Assignee: Chevron U.S.A. Inc., San Ramon, CA (US)

(*) Notice: Subject to any disclaimer, the term of this patent is extended or adjusted under 35 U.S.C. 154(b) by 519 days.

This patent is subject to a terminal disclaimer.

(21) Appl. No.: 12/912,906

(22) Filed: Oct. 27, 2010

(65) Prior Publication Data
US 2012/0012087 A1    Jan. 19, 2012

Related U.S. Application Data

(60) Provisional application No. 61/256,813, filed on Oct. 30, 2009.

(51) Int. Cl.
| C10L 1/10 | (2006.01) |
| C10L 1/06 | (2006.01) |
| C10L 1/04 | (2006.01) |
| F02D 15/00 | (2006.01) |
| F02D 19/00 | (2006.01) |
| F02D 41/40 | (2006.01) |
| F02M 25/07 | (2006.01) |

(52) U.S. Cl.
CPC ... C10L 1/06 (2013.01); C10L 1/04 (2013.01); *C10L 2200/0407* (2013.01); *C10L 2270/023* (2013.01); *F02D 15/00* (2013.01); *F02D 19/00* (2013.01); *F02D 41/403* (2013.01); *F02M 25/07* (2013.01)

(58) Field of Classification Search
CPC .............. C10L 1/04; C10L 1/06; C10L 1/08; C10L 2200/0407; C10L 2270/023; C10G 2400/02; C10G 2400/04
USPC ........................... 44/300; 585/14; 208/15, 16
See application file for complete search history.

(56) References Cited

U.S. PATENT DOCUMENTS

| 3,926,779 A * | 12/1975 | Wilson et al. .................... 208/65 |
| 2009/0151236 A1 | 6/2009 | Shibata |
| 2009/0211825 A1 | 8/2009 | Mann et al. |
| 2011/0271925 A1 | 11/2011 | Cannella et al. |

FOREIGN PATENT DOCUMENTS

| JP | 2006-077179 A | 3/2006 |
| JP | 2006-77179 A | 3/2006 |

(Continued)

OTHER PUBLICATIONS

Kalghatgi et al, Advantages of Fuels with High Resistance to Auto-ignition in Late-injection, Low-temperature, Compression Ignition Combustion, 2006-01-3385, *SAE Technical Paper Series*, 2006.

(Continued)

*Primary Examiner* — Cephia D Toomer
(74) *Attorney, Agent, or Firm* — M. Carmen & Associates, PLLC

(57) ABSTRACT

A fuel composition having a boiling range of between 95 to 440 degrees Fahrenheit wherein the fuel composition has (a) a total sum of n-paraffins and naphthenes content of at least 22 volume percent and (b) a RON of about 93 or less, wherein the fuel is employed in an advanced combustion engine.

10 Claims, 12 Drawing Sheets

(56) References Cited

FOREIGN PATENT DOCUMENTS

| | | | |
|---|---|---|---|
| JP | 2006077179 | * | 3/2006 |
| JP | 2006-213769 A | | 8/2006 |
| JP | 2007-291309 A | | 11/2007 |
| JP | 2007-291310 A | | 11/2007 |
| JP | 2008-031436 A | | 2/2008 |
| WO | WO2011053650 | * | 5/2011 |

OTHER PUBLICATIONS

Kalghatgi et al, Partially Pre-Mixed Auto-Ignition of Gasoline to Attain Low Smoke and Low NOx at High Load in a Compression Ignition Engine and Comparison with a Diesel Fuel, 2007-01-0006, *SAE Technical Paper Series*, 2007.

Leffler, W., Petroleum Refining, *PennWell Cor.*, 2000, p. 9-45.

Manente et al, Partially Premixed Combustion at High Load using Gasoline and Ethanol, a Comparison with Diesel, 2009-01-0944, *SAE Technical Paper Series*, 2009.

Noehre et al, Characterization of Partially Premixed Combustion, 2006-01-3412, *SAE Technical Paper Series*, 2006.

Kalghatgi, et al. "Combustion Limits and Efficiency in a Homogeneous Charge Compression Ignition Engine", International Journal of Engine Research, Professional Engineering Publishing, GB, vol. 7, No. 3 (Jan. 1, 2006), pp. 215-236.

Office Action issued in counterpart Japanese Patent Application No. 2012-537005 dated Jun. 17, 2014.

Japanese Office Actions issued in counterpart Japanese Patent Application Nos. 2015-098434 and 2012-537005 received from the Japanese Patent Office, 2016.

\* cited by examiner

Inlet Conditions - EGR

Engine Inlet Conditions – Percentage Total Fuel Injected in Pilot

Soot Emissions

Maximum Pressure Rise Rates vs. Total Sum n-Paraffins and Naphthenes

Maximum Pressure Rise Rates vs. RON

FUEL COMPOSITION

This application claims the benefit of the filing date of the U.S. Provisional Application Ser. No. 61/256,813, filed Oct. 30, 2009.

FIELD OF THE INVENTION

The present invention relates to fuel compositions that yield very low soot and low $NO_x$ emissions while having high efficiencies and acceptable maximum in-cylinder pressure rise rates over a wide load range when used in an advanced combustion engine environment, especially one operating in partially-premixed combustion (PPC) mode.

BACKGROUND OF THE INVENTION

Continued global emphasis and government legislation on reducing emissions and improving fuel economy of internal combustion engines has led to the need to develop advanced high efficiency, clean combustion engines. Exhaust aftertreatment systems (such as Selective Catalyst Reduction (SCR), lean $NO_x$ traps, and diesel particulate filters) have been designed and commercialized to lower exhaust emissions to meet emission targets and regulations. However, these systems are costly, add to the weight of the vehicle, and minimize fuel economy due to the added weight and the need to use fuel to regenerate the systems. Reducing engine-out emissions would decrease the size and/or eliminate the need for these systems. Worldwide, a large R&D effort is underway at a multitude of industrial, government, and academic organizations to identify engine designs, operating conditions, and fuel compositions to accomplish that objective. One advanced combustion approach being considered is Homogeneous Charge Compression Ignition (HCCI) in which fuel is injected very early into the engine to enable a homogeneous mixture of air and fuel to be obtained prior to the start of combustion initiated through compression ignition. One significant drawback to that approach is that it is difficult to control the combustion process and high pressure rise; and, furthermore, heat release rates occur resulting in unacceptably high noise levels and potential engine damage. Thus, currently the operating speed-load range where acceptable performance can be obtained is very limited.

Another approach to optimize engine designs, operating conditions and fuel compositions is to employ fuels in a Partially Premixed Combustion (PPC) environment. In PPC settings, fuel injection timing is closer to top dead center and so the air and fuel are not completely mixed prior to combustion. By applying this strategy with high rates of cooled exhaust gas recirculation/recycle (EGR), the combustion event occurs and results in low soot and low $NO_x$. As compared to Homogeneous Charge Compression Ignition (HCCI), the control of the combustion in a PPC engine environment is re-gained along with the potential to reduce the rate of heat release and the maximum pressure rise rate.

Partially premixed combustion has been known to potentially reduce $NO_x$ and soot for diesel engines. However, to this point, specific fuel compositions have not been developed to obtain the best synergy among the fuel mixture, partially premixed combustion and reduction in $NO_x$ and soot.

We have discovered that specific gasoline fuel compositions having research octane numbers from about 69 to about 90 can have high gross efficiencies exceeding 50% and enable operation over a wide load range (up to or exceeding 18 bar gross IMEP) and provides significant reductions in $NO_x$ and soot when used in a PPC-type mode in compression ignition engine environment. Further, within the gasoline boiling range, fuel properties and fuel composition have been found to significantly influence the pressure rise rate; and, specific fuel compositions have been found which lead to acceptable engine performance values.

DESCRIPTION OF THE RELATED ART

In 1998 Nissan produced a limited number of diesel-fueled vehicles using a PPC-type approach that they called MK-combustion. However, the operating range where PPC operation worked satisfactorily was very limited and the production of those engines was discontinued.

Noehre et al. (SAE Paper 2006-01-3412) achieved relatively low $NO_x$ and soot using diesel fuel in a diesel engine operating under PPC-type mode. However, to achieve a moderate-to-high load of 15 bar indicated mean effective pressure (IMEP), it was necessary to use a practically unrealistic high level of EGR (approximately 70%) and a relatively low compression ratio of 12:1. As a result of the compression ratio, engine efficiency was penalized.

Kalghatgi et al. (SAE papers 2006-01-3385 and 2007-01-0006) proposed using high octane gasoline in PPC-type operation to lower soot levels. In those studies in a Scania D12 heavy duty (compression ignition) CI engine with a compression ratio of 14:1, they only tested a premium gasoline with a RON of 94.7. Hydrocarbon and CO levels were relatively high.

Manente et al. (SAE paper 2009-01-0944) tested a premium gasoline (RON of 98) in a Scania D12 heavy duty CI engine and obtained gross specific efficiencies up to 45%, which was at least as good as those for diesel fuel. $NO_x$ and soot were lower than for diesel fuel, however, hydrocarbon and CO levels were also high. Manente et. al state that that work "demonstrates that the best fuel for a Compression Ignition engine has to be with high Octane Number."

Although researchers such as Kalghatgi et al. and Manente et al. have demonstrated that premium gasoline can provide lower $NO_x$ and soot levels than diesel fuel in PPC-type operation, fuel having an octane number as high as premium gasoline may not be the optimal fuel that permits sufficient expansion of the speed-load operating range to enable full-time operation. Furthermore, fuel chemistry and composition may be an important parameter for optimal performance rather than octane number.

SUMMARY OF THE INVENTION

In one embodiment, the present invention is directed to a fuel composition having a boiling range of between 95 to 440 degrees Fahrenheit wherein the fuel composition has (a) a total sum of n-paraffins and naphthenes content of at least 22 volume percent and (b) a RON of about 93 or less, wherein the fuel is employed in an advanced combustion engine.

In one embodiment, the present invention is directed to a method of operating an internal combustion engine comprising,
  i. employing a fuel composition in an internal combustion engine, wherein the fuel composition has (a) a boiling range of between 104 to 401 degrees Fahrenheit, wherein the fuel composition has (b) total sum of n-paraffins and naphthenes content of 22 volume percent or higher and (c) wherein in the RON is about 93 or less;
  ii. operating the internal combustion engine, wherein the compression ratio is from about 12:1 to about 16:1 and wherein the internal combustion engine is operated under partially premixed combustion conditions;

iii. wherein the fuel composition is employed at a load of at least up to 18 bar gross IMEP and engine out NOx emissions are no more than 0.35 grams/kilowatt-hr; (0.3 grams/kilowatt-hr); and iv. wherein the exhaust gas recirculation rate is less than 60 volume percent.

DETAILED DESCRIPTION OF THE INVENTION

Figure 1:
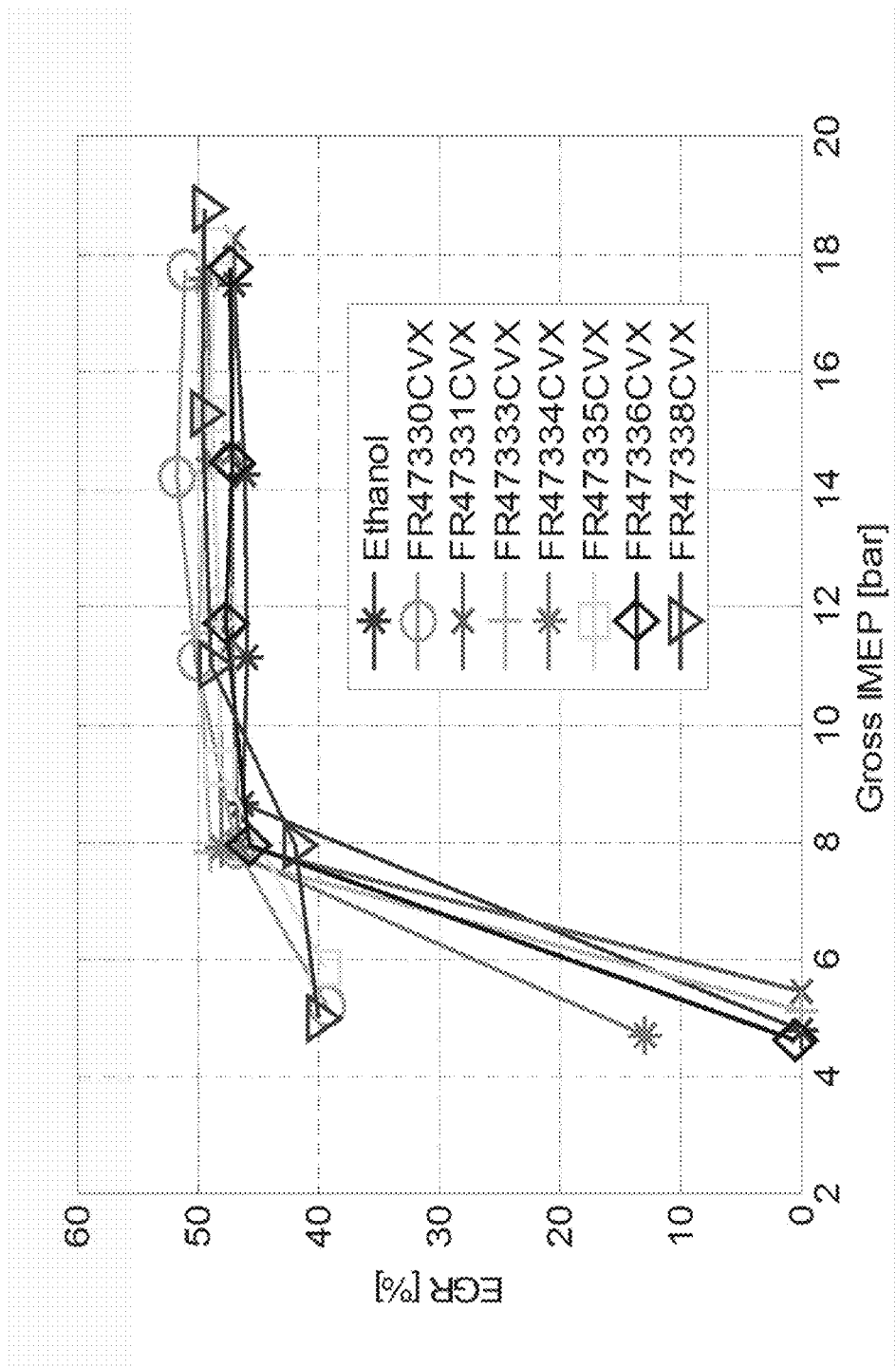
FIG. 1 depicts the Exhaust Gas Recycle (EGR) rates that were used.

While the invention is susceptible to various modifications and alternative forms, specific embodiments thereof are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

Definitions

RON— The Research Octane Number is measured in a specially designed single cylinder CFR engine at an engine speed of 600 rpm and a specified intake air temperature that depends on barometric pressure. It reportedly simulates fuel performance under low severity engine operation.

Advanced Combustion Engines are defined as engines that produce ultra low $NO_x$ or low soot or both. An example of an Advanced Combustion Engine is a Partially Premixed Combustion Engine.

Fuel Composition

One embodiment of the present invention is directed to fuel compositions that provide: (a) a significant reduction in $NO_x$, (b) a reduction in soot emissions, and (c) high efficiencies, especially when compared to conventional diesel fuel compositions, when the fuels of the present invention are employed in a partially premixed combustion mode in an advanced combustion engine. Preferably, the fuel composition is a gasoline-type fuel composition that is employed in a diesel-type engine under partially premixed combustion conditions. Furthermore, for certain fuel compositions of the present invention, reasonable maximum pressure rise rates are obtained, thus significantly expanding the range where the engine can be run under advanced combustion conditions satisfactorily.

The fuel composition employed in one embodiment of the present invention preferably has a Research Octane Number (RON) of about 90 or less and a total sum of n-paraffins and naphthenes of at least 22 volume percent. More preferred, the fuel composition has a RON of about 85 or less and a total sum of n-paraffins and naphthenes of at least 22 volume percent. Most preferred, the fuel composition has a RON of about 80 or less and a total sum of n-paraffins and naphthenes of at least 22 volume percent.

In one embodiment the fuel composition preferably has a RON of about 90 or less and a total sum of n-paraffins and napththenes of at least 25 volume percent. More preferred, the fuel composition has a RON of about 90 or less and a total sum of n-paraffins and naphthenes of at least 30 volume percent.

Method of Making the Fuel Composition

The fuels employed in the presently claimed invention were taken from a commercial refinery and in some cases n-heptane or ethanol was added. Information about typical processes and conditions for making these fuels can be found in "Petroleum Refining" by William Leffler (PennWell Corp, 2000).

Engine Conditions

The fuel of the present invention was employed in an advanced engine combustion environment. In one embodiment, the advanced combustion engine is operated in a partially premixed combustion mode.

Such combustion environments typically result in fuels that have been combusted and produce ultra low $NO_x$ emissions (e.g., less than 0.35 grams/kilowatt-hr) or produce low soot (e.g., FSN <2) or both. In addition to producing low NOx emissions or low soot or both, these fuels are employed in an engine environment as described below.

Preferably, the engine load was up to about at least 18 bar gross indicated mean effective pressure (IMEP). More preferred, the engine load was up to about 16 bar gross IMEP.

Furthermore, in one embodiment of the present invention, the aforementioned fuel composition is employed in an internal combustion engine and when the engine load is up to at least 18 bar gross IMEP, then preferably the engine out $NO_x$ levels are no more than 0.35 grams/kilowatt-hr. More preferred, when the engine load is up to at least about 18 bar gross IMEP, then the engine out $NO_x$ levels are no more than 0.3 grams/kilowatt-hr.

Furthermore, in one embodiment of the present invention, the aforementioned fuel composition is employed in an internal combustion engine having a compression ratio of from about 12:1 to about 16:1. More preferred, the compression ratio is from about 13:1 to 15:1. Most preferred, the compression ratio is 14:1.

In one embodiment of the present invention, the aforementioned fuel composition is employed in an internal combustion engine that preferably has an exhaust gas recirculation rate that is less than 60 volume percent. More preferred, the exhaust gas recirculation rate is less than 55 volume percent.

In one embodiment, the aforementioned fuel composition is employed in an internal combustion engine that preferably has a maximum pressure rise rate of less than about 15 bar/crank angle degree (CAD). More preferred, the maximum pressure rise rate is less than about 13 bar/CAD.

The following examples are presented to illustrate specific embodiments of this invention and are not to be construed in any way as limiting the scope of the invention.

EXAMPLES

Engine—

The engine used during the experiments was a heavy duty single cylinder compression ignition engine, Scania D12

(which may be purchased from Scania, Sweden). The cylinder head was flat and the piston used was shallow bowl type. The geometrical properties of the engine are found in Table 1. The engine was boosted by using compressed air from an external air line; the inlet pressure was adjusted by using a waste gate valve. A heater (which may be purchased from Leister Process Technologies, Sweden) placed before the inlet manifold, was used to heat up the air at the desired inlet temperature.

TABLE 1

Geometrical Properties of the Scania D12 Engine

| | |
|---|---|
| Displaced volume | 1966 [cm3] |
| Stroke | 154 [mm] |
| Bore | 127.5 [mm] |
| Connecting Rod | 255 [mm] |
| Compression ratio | 14.3:1 |
| Swirl Ratio | 2.9 [-] |

EGR—

Exhaust gas is recycled to the internal combustion engine. The exhaust gas recirculation (EGR) is defined as the ratio of carbon dioxide in the intake and exhaust (i.e., $[CO_2]$intake/$[CO_2]$exhaust). The exhaust gases were cooled down before being introduced into the intake system of the D12 engine.

Injection System—

The Scania D12 engine was equipped with an early generation common rail injection system from Bosch (Bosch GmbH, Germany). The commercial nozzle was replaced with one that had an umbrella angle of 120°. The nozzle had 8 orifices, their diameter was 0.18 mm. The fuel flow was measured by using a gravity scale with two digits precision from Sartorius and each operative point was sampled for at least two minutes.

Emission Measurements Systems—

The emissions were measured using a Cussons gas analysis system (which may be purchased from Cussons, England). CO and $CO_2$ were measured by non-dispersive infrared analyzer; $O_2$ was measured with a paramagnetic analyzer; and, total hydrocarbons were measured with a heated flame ionization detector. A chemiluminescent analyzer was used to measure $NO_x$ and the smoke was measured with an AVL 415 opacimeter. Each analyzer was calibrated with an appropriate calibration gas before every set of measurements.

Fuels

Seven fuels and ethanol (99.5% by vol.) were tested in the D12 Scania engine. Each fuel was evaluated for maximum pressure rise rate, engine efficiency, $NO_x$ emissions, soot emissions, hydrocarbon emissions and carbon monoxide emissions when each fuel is employed at several load sweeps (i.e., varying loads).

The seven fuels were in the gasoline boiling point range, having a boiling point of from about 95 to 440 degrees Fahrenheit; the main properties of the fuels employed in the present invention are listed in Table 2.

TABLE 2

Fuels and Their Properties

| FUEL BLEND | RON | MON | n-paraffins vol. % | iso-paraffins vol. % | Naphthenes vol. % | aromatics vol. % | olefins | Sum total of n-paraffins + naphthenes |
|---|---|---|---|---|---|---|---|---|
| Example 1 | 70.3 | 65.9 | 4.4 | 45.0 | 32.2 | 11.6 | 0.3 | 36.6 |
| Example 2 | 69.4 | 66.1 | 33.8 | 35.5 | 5.8 | 18.8 | 5.3 | 39.6 |
| Example 3 | 78.2 | 73.4 | 28.0 | 37.1 | 6.9 | 25.5 | 1.8 | 34.9 |
| Comparative Example 1 | 99 | 96.9 | 0.9 | 95.3 | 0.8 | 1.2 | 1.6 | 1.7 |
| Comparative Example 2 | 88.6 | 79.5 | 4.9 | 32.8 | 12.2 | 19.7 | 29.6 | 17.1 |
| Comparative Example 3 | 87.1 | 80.5 | 13.6 | 47.8 | 7.6 | 22.8 | 7.2 | 21.2 |
| Comparative Example 4 | 92.9 | 84.7 | 13.3 | 40.0 | 8.0 | 26.3 | 2.0 | 21.3 |
| Comparative Example 5 (Ethanol-EtOH) | 129 | 102 | 0 | 0 | 0 | 0 | 0 | 0 |

Figure 2:
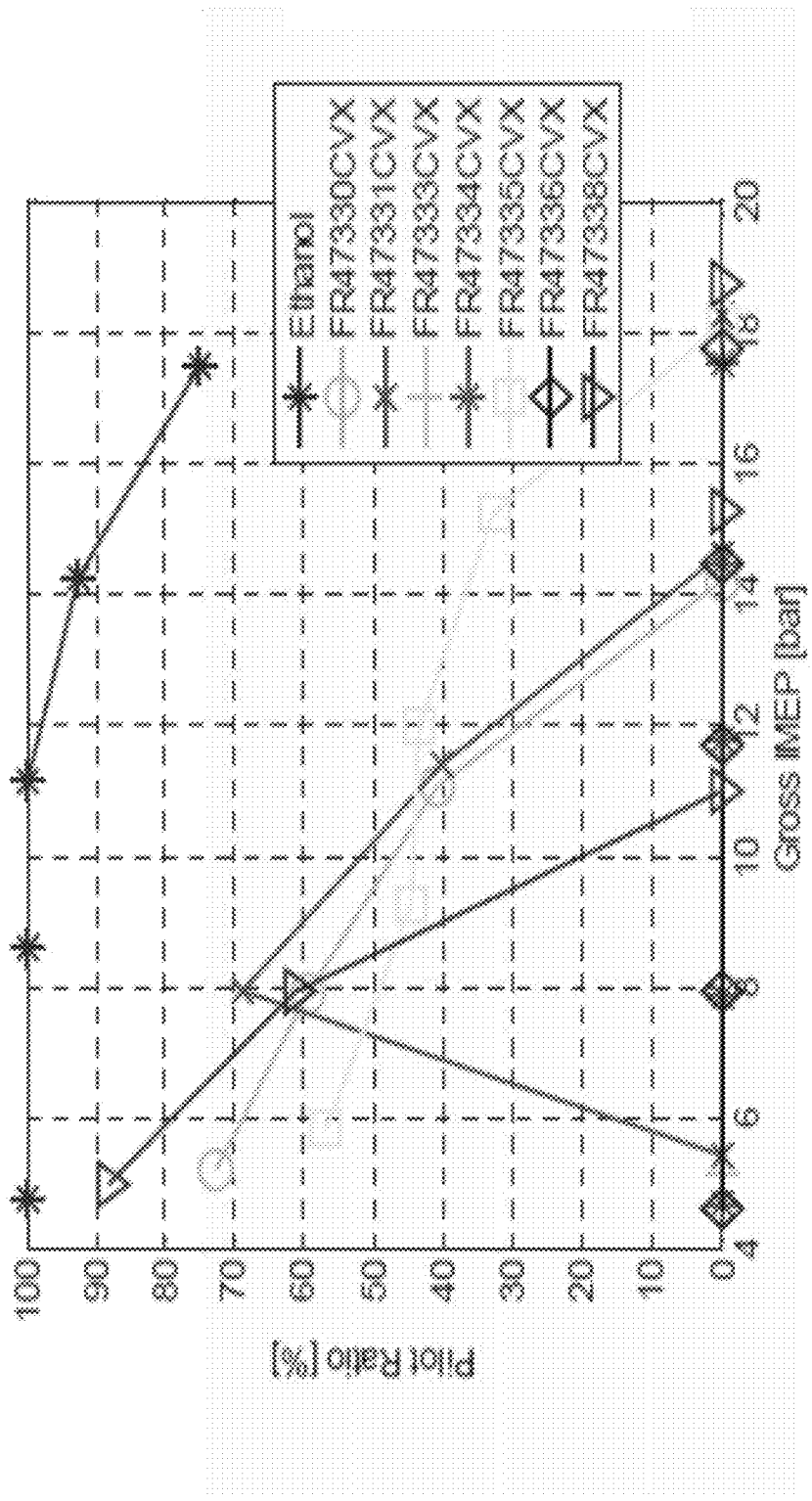
FIG. 2 depicts the percentage of total fuel injected in pilot injection.
Figure 3:
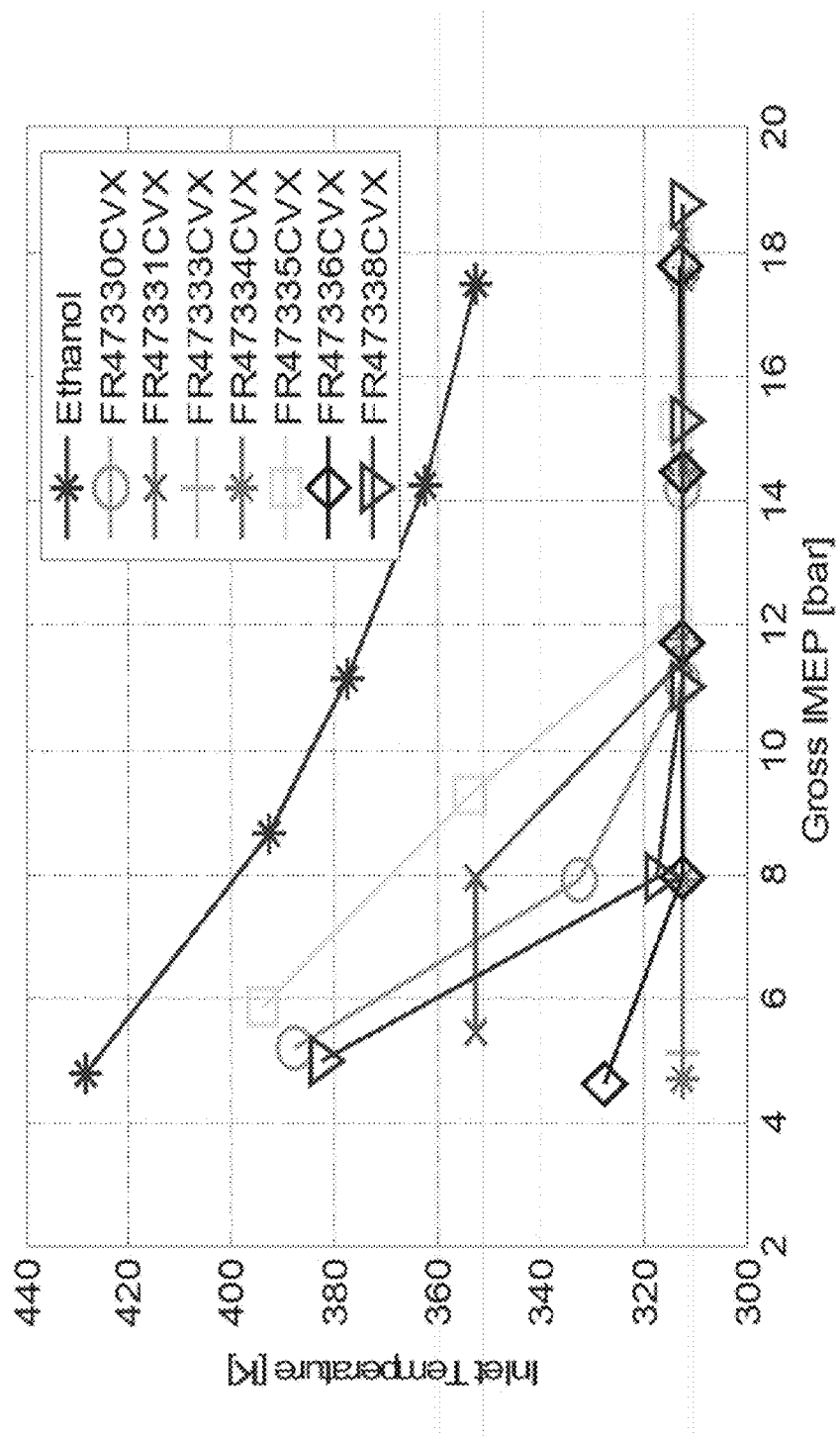
FIG. 3 depicts the inlet temperature of air injected into engine.

The seven fuels and ethanol were tested through a load sweep at 1300 rpm. Five load points were selected: 5, 8, 12, 14 and 18 bar gross IMEP (indicated mean effective pressure). The injection strategy consisted of using one or two fuel injection points to inject the fuel or ethanol into the combustion chamber of the engine. When used, the first or pilot injection point was placed very early in the compression stroke cycle to create a homogeneous mixture while the second one was injected near top-dead center to trigger the combustion event. The fuel amount in the pilot injection is independent of the load and it is only a function of compression ratio, fuel reactivity, and EGR level. When used, the pilot injection always occurred at −60 top dead center (TDC). As the load was increased, pilot injection was no longer beneficial and was not employed for all of the fuels, except ethanol which was still injected at the pilot point and at the second injection point. The pilot ratios (i.e., the amount of fuel injected into the pilot injection point relative to the total amount of fuel injected) that were used are displayed in FIG. 2. As shown in FIG. 3, the inlet temperature was adjusted to keep stable combustion with all the fuels throughout the load sweep.

It was decided that $NO_x$ should be maintained at less than about 0.35 g/kWh at a maximum load (i.e., 18 bar). To achieve this $NO_x$ level about 50% of EGR was used with all the fuels from 8 to 18 bar IMEP; see FIG. 5. For combustion stability reasons at 5 bar IMEP it was decided to reduce/eliminate EGR.

Results

A load sweep was carried out between 5 and 8 bar gross IMEP at 1300 rpm using 7 different fuels and ethanol. The RON of each fuel and ethanol was between 69 and 129.

The fuels were injected into the Scania D12 engine as described hereinabove.

Efficiency

Figure 4:
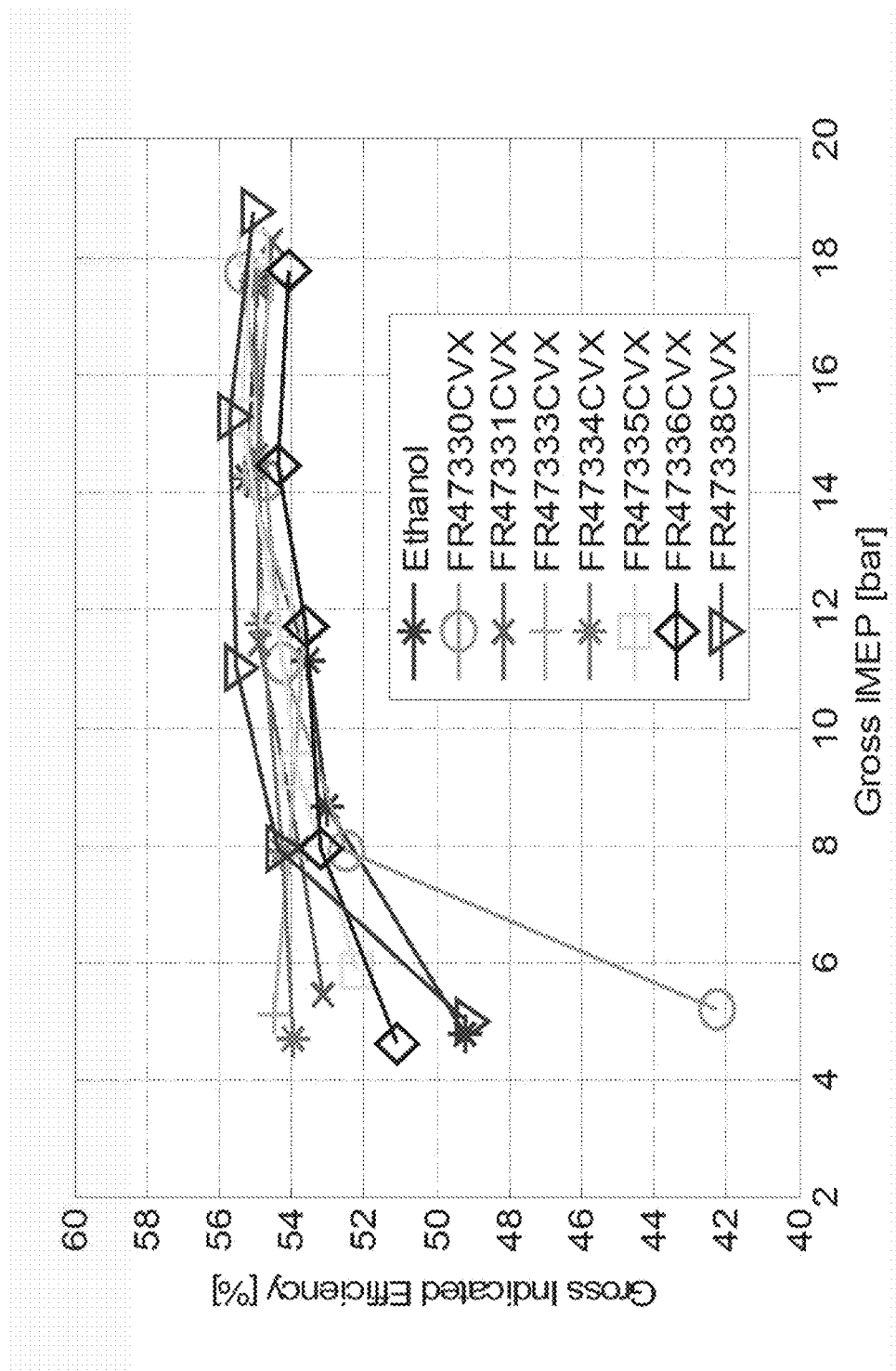
FIG. 4 depicts the engine Gross Indicated Efficiencies.
Figure 5:
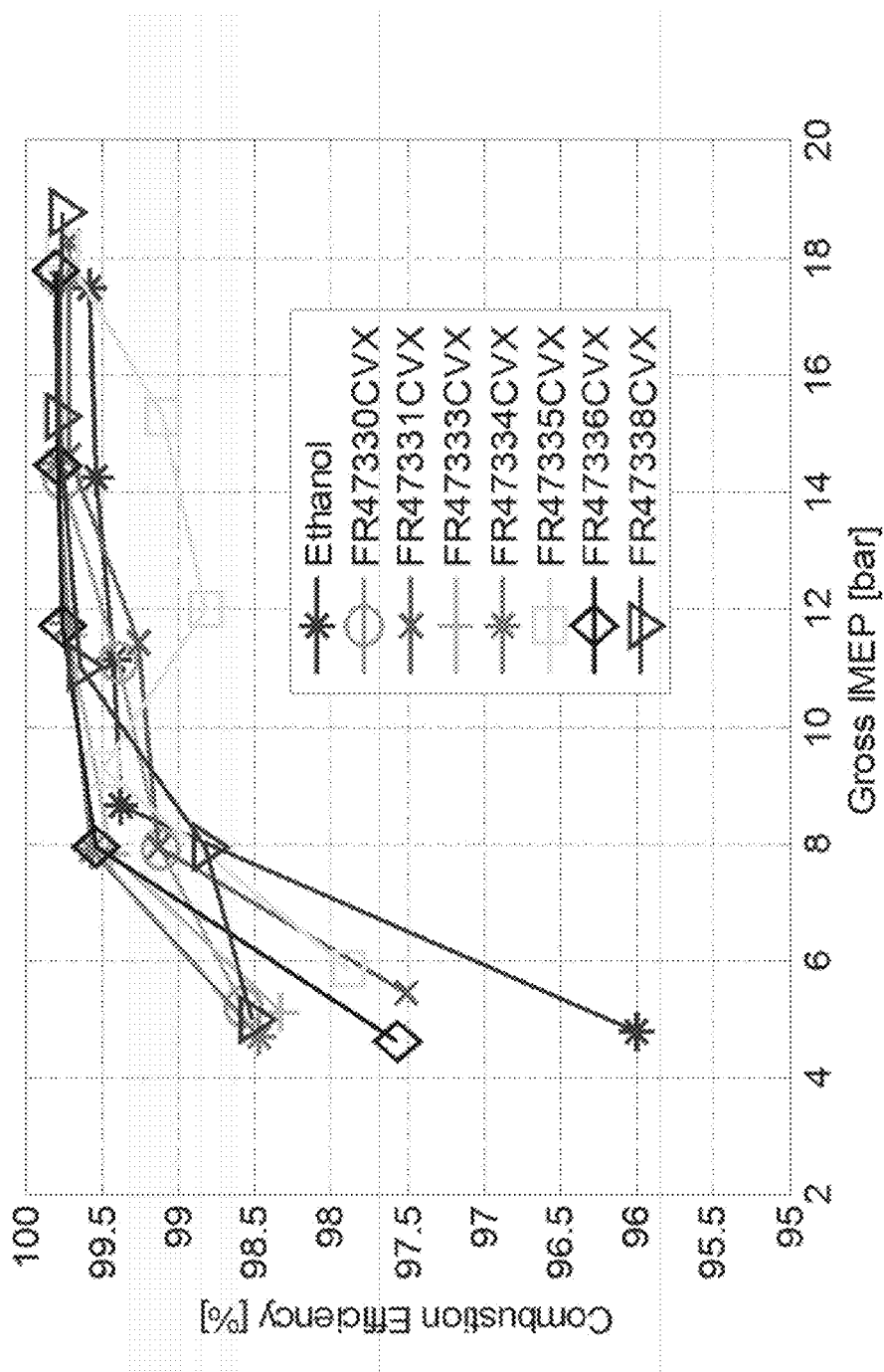
FIG. 5 depicts the combustion efficiencies obtained with the fuels tested.

The efficiency of the engine (i.e., engine performance) is an important parameter that is dependent upon the fuel employed in the internal combustion engine. The gross indicated efficiency as a function of load for these 7 fuels and ethanol is plotted in FIG. 4. As depicted in FIG. 4, for loads higher than 8 bar gross IMEP, efficiency is greater than 50% for all of the fuels and ethanol. The efficiencies are higher than those reported by Kalghatgi et. al. and Manente et. al for high octane premium gasoline. FIG. 5 shows that even though up to 50% of EGR was used, the combustion efficiency was higher than 98% for loads higher than 5 bar IMEP.

Emissions

Figure 6:
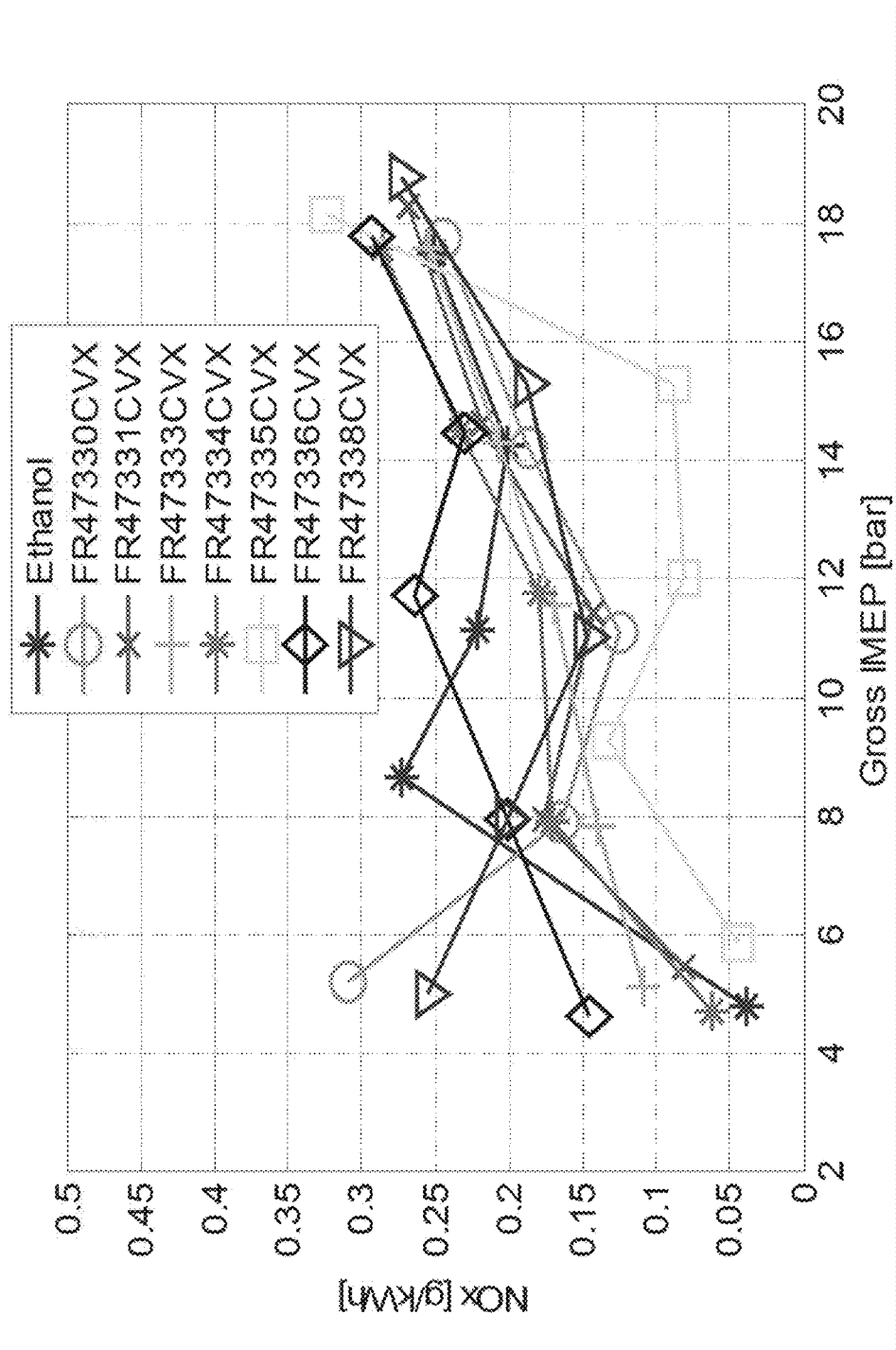
FIG. 6 depicts the NOx emissions for the fuels tested.

The gross indicated $NO_x$ emissions are shown in FIG. 6. 50% EGR and a compression ratio of 14.3 was employed with all the fuels and ethanol. For the fuels of the invention (i.e., Examples 1-3) these engine operating conditions resulted in very low $NO_x$ levels below 0.3 g/kWh. This NOx level was also achieved at 18 bar gross IMEP. When the load was decreased for the fuels of the invention, NOx emissions decreased.

Figure 7:
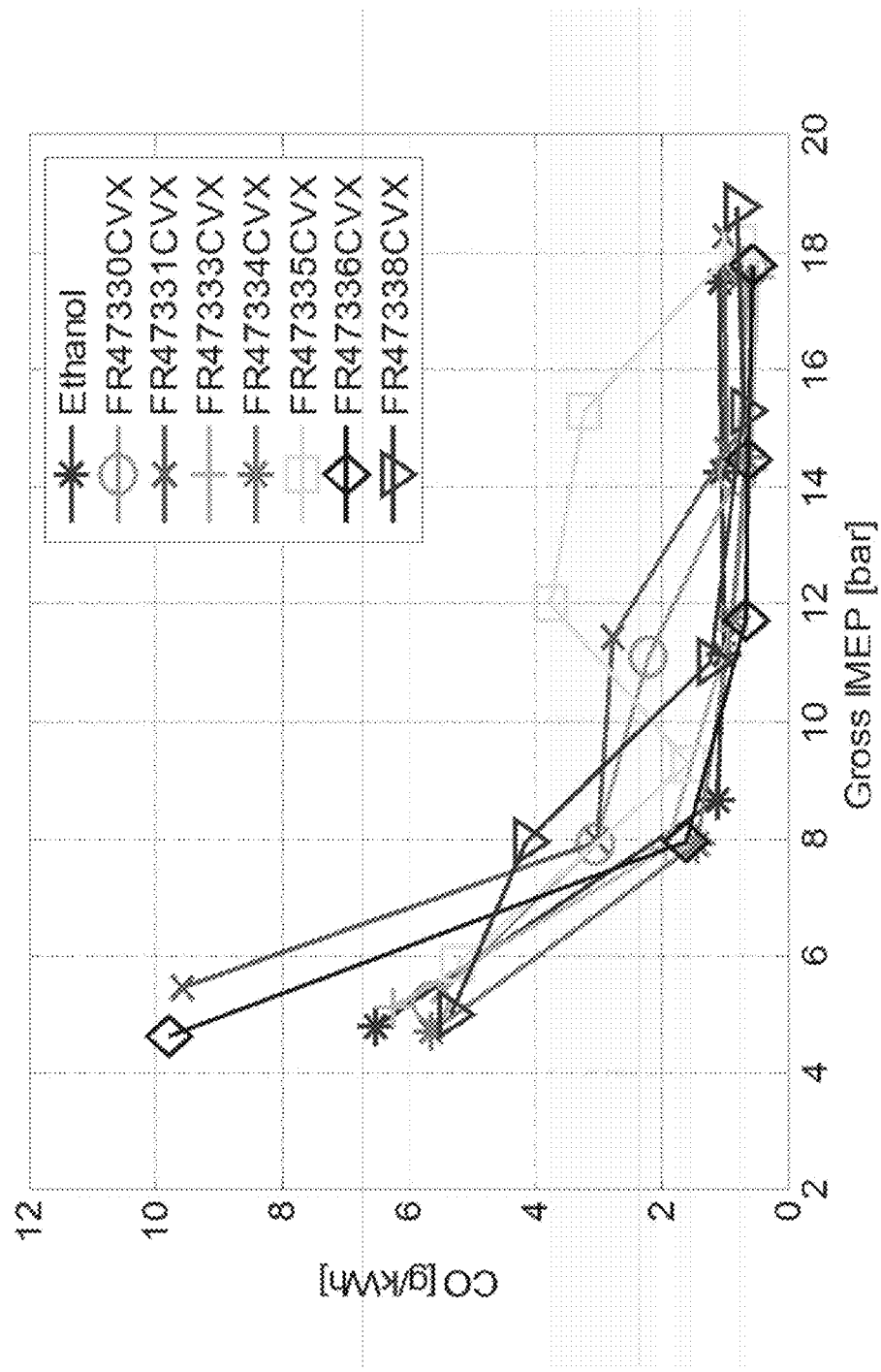
FIG. 7 depicts the CO emissions for the fuels tested.
Figure 8:
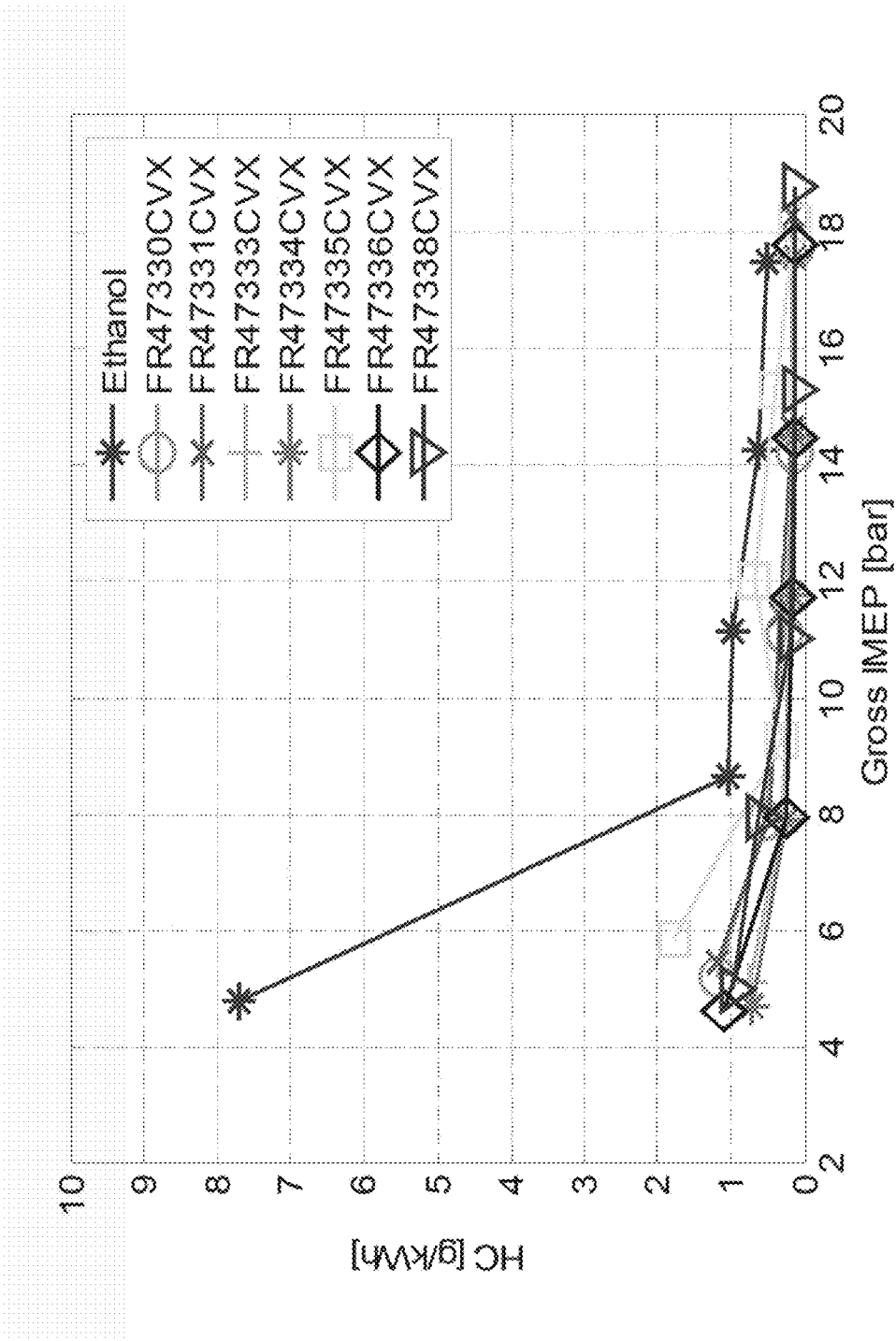
FIG. 8 depicts the hydrocarbon (HC) emissions for the fuels tested.

Because of the high combustion efficiency, at the lowest load (i.e., 5 bar IMEP) low values of CO and HC were obtained for all of the fuels, although ethanol shows significantly higher hydrocarbon emissions at the lowest load of 5 bar IMEP (see FIG. 7 and FIG. 8 respectively).

By contrast, at a high load (i.e., 18 bar) it would be difficult to obtain the same values using diesel fuel in PPC mode. The low values of CO and $NO_x$ obtained in the current work are suggesting that with mid-to-high octane number fuels running in PPC mode it is possible to burn the fuel-air mixture in the temperature range between 1500 and 2000 [K]. A combustion temperature higher than 1500 [K] is necessary to promote the reactions from CO to $CO_2$, in essence it is important to be below 2000 [K]

Figure 9:
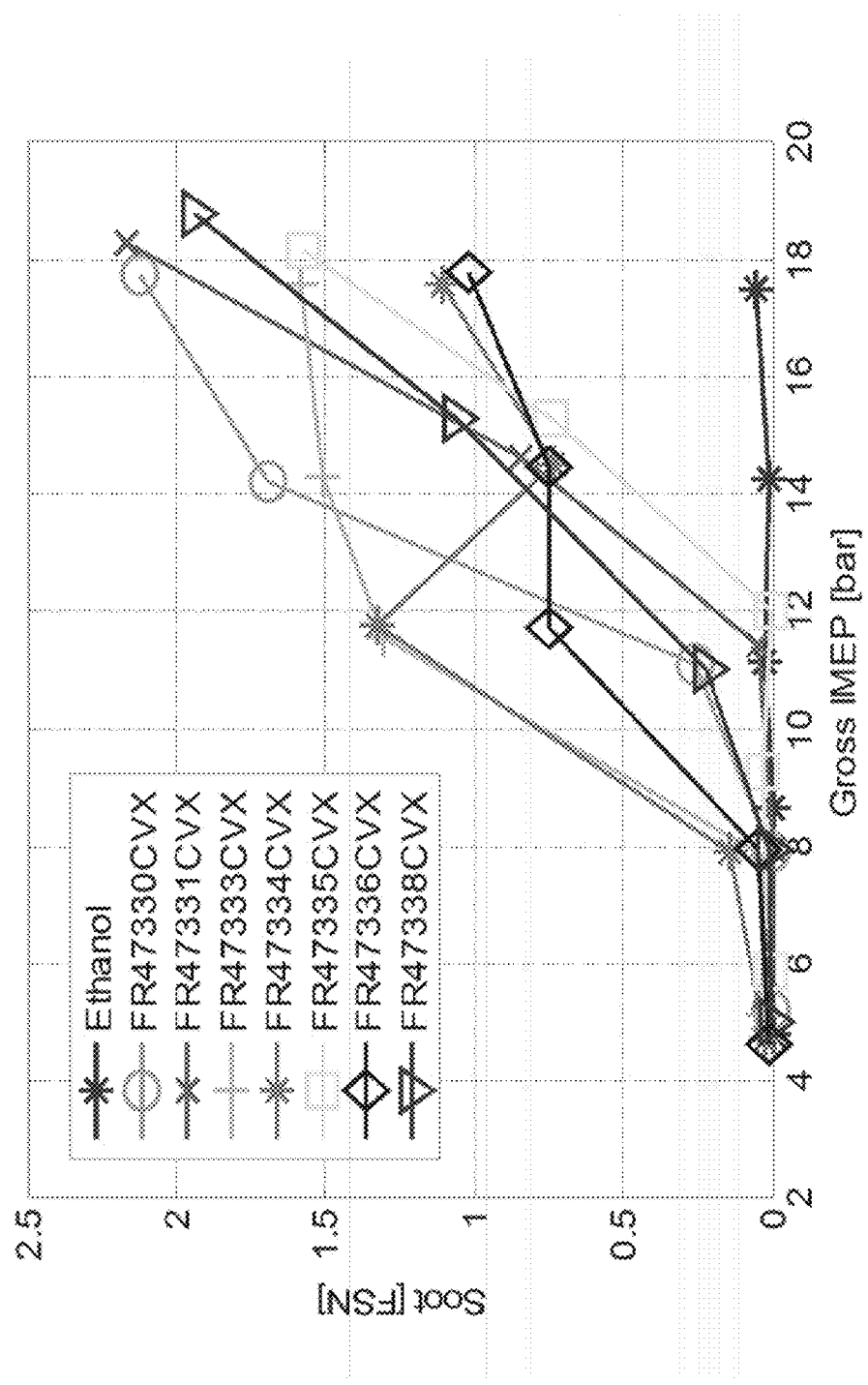
FIG. 9 depicts soot emissions for the fuels tested.

Soot levels were very low (<1 FSN) for all of the fuels up to a load of about 12 bar IMEP, as shown in FIG. 9. As the load increased, the soot levels for the petroleum-derived fuels increased to a level between 1 and 2.1 FSN at a load of 18 bar gross IMEP. These are still fairly low levels. The lowest soot values at that load point were obtained for Example 2 and Example 1.

Engine Noise/Maximum Rate of Pressure Rise

Figure 10:
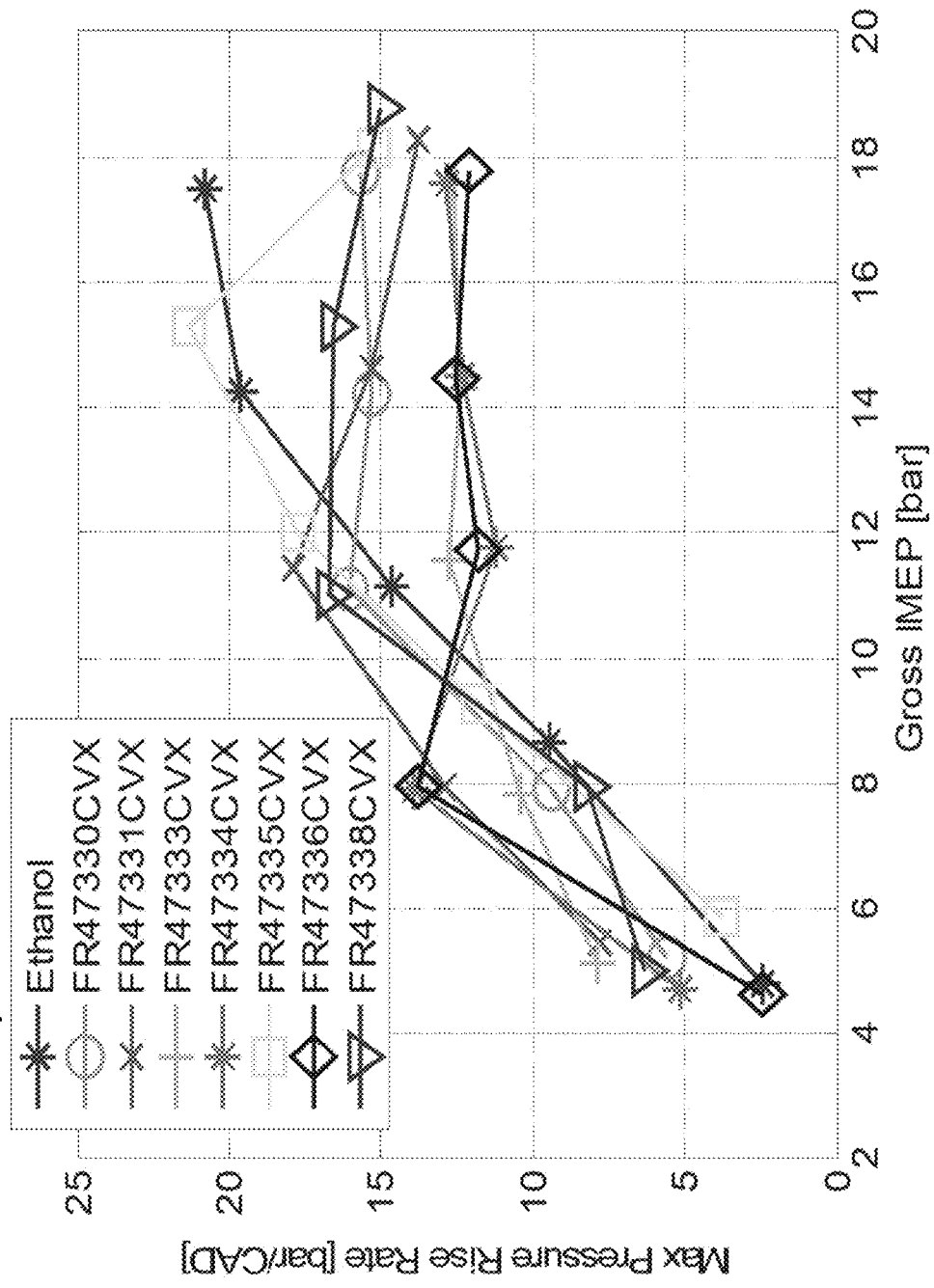
FIG. 10 depicts the in cylinder maximum pressure rise rates that were obtained.
Figure 11:
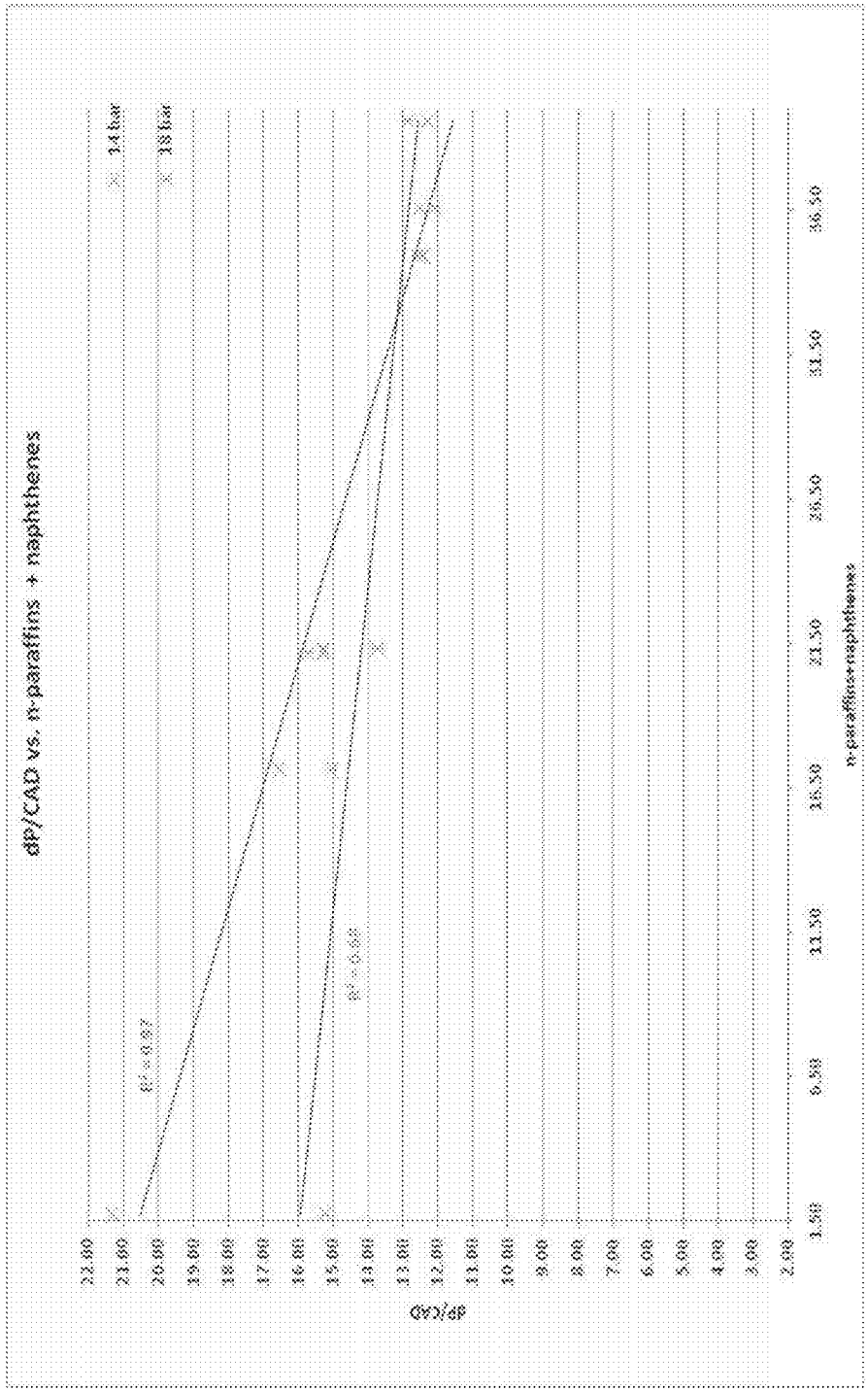
FIG. 11 depicts the correlation we discovered between maximum pressure rise rates and fuel composition.
Figure 12:
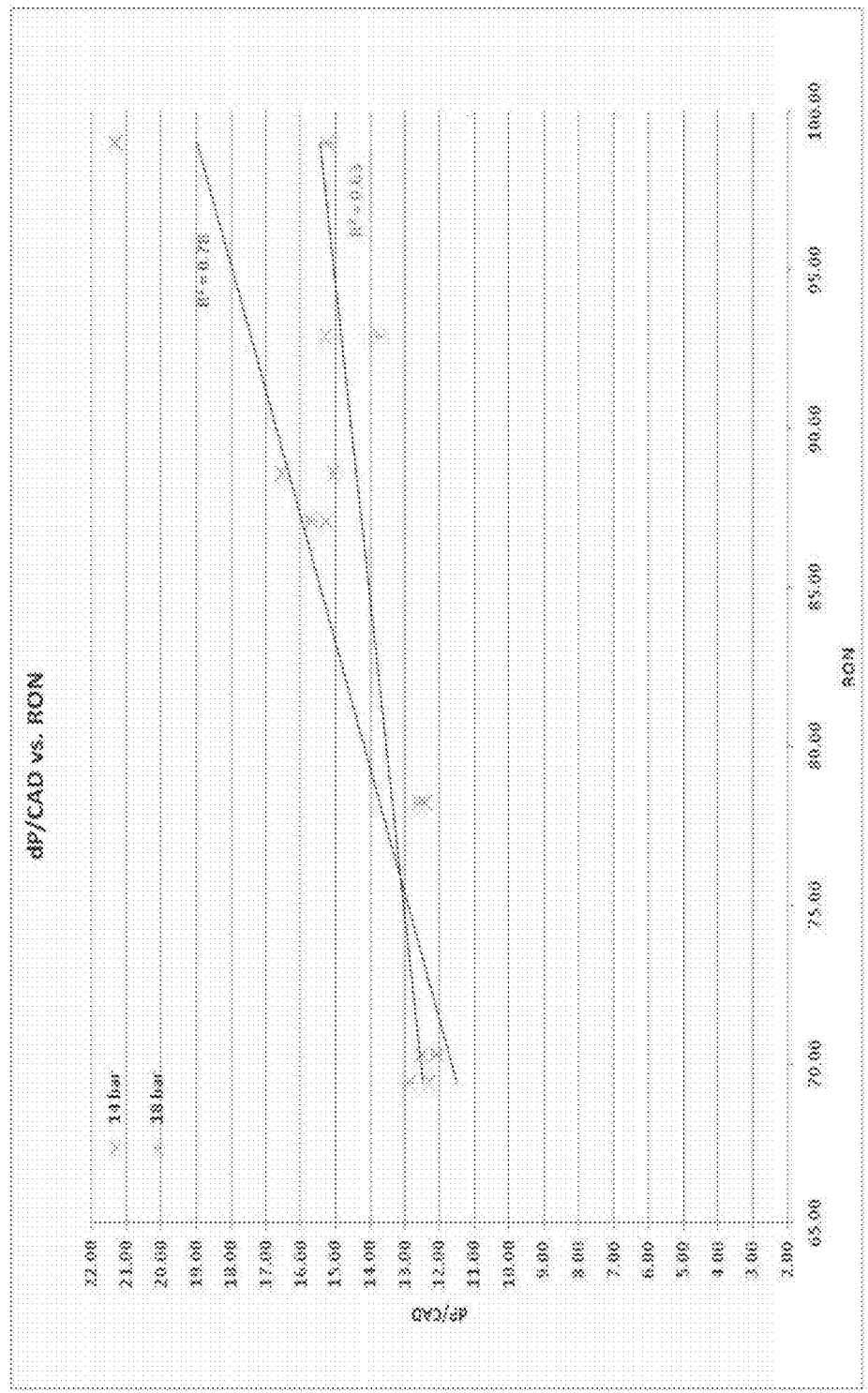
FIG. 12 depicts correlation between maximum pressure rise rates and RON.

One of the key challenges of advanced combustion systems such as partially premixed combustion and HCCI at high load is the maximum pressure rise rate which relates to the engine acoustic noise. The operating ranges of previous studies are limited to moderate loads due to unacceptable levels of maximum pressure rise rate and engine noise. The maximum pressure rise rates in the current study are plotted in FIG. 10 as a function of load. At loads higher than 12 bar gross IMEP fuels, the best performing fuels are the fuel of Example 3 and Example 2, and the fuel of Comparative Example 2 for which the maximum pressure rise rates do not exceed 12.5 bar/CAD. The poorest performing fuels were Comparative Example 5 and Comparative Example 1 with maximum pressure rise rates that exceed 20 bar/CAD. The maximum pressure rise rates appear to correlate with the properties of the fuels. The rates are plotted vs. the sum total of n-paraffins plus naphthenes content (FIG. 11) and vs. RON (FIG. 12) at the highest loads where the maximum pressure rise rates are the highest and of the greatest concern. Although directionally the maximum pressure rise rates are correlated with RON, a better correlation is obtained with a specific fuel composition, specifically the sum total of n-paraffins plus napthenes in the fuel.

Thus, we have discovered that reasonable pressure rise rates (along with high gross efficiency and very low emissions) can be obtained at over a wide range of loads conditions in advanced combustion, especially partially premixed combustion using gasoline-type fuels containing more than 22 volume percent of a sum total n-paraffins plus naphthenes, with corresponding RON's below 93.

In general, employing a fuel composition having a sum total of n-paraffins and naphthenes content of at least 22 volume percent and a RON of 93 or less, resulted in engine efficiencies of from about 50% to about 60%, and more so from 54% to 56% in loads of less than 18 gross IMEP.

Furthermore, when 50% of EGR was employed in the engine, $NO_x$ emissions were no more than 0.35 g/kWh even at high 18 bar gross IMEP.

Employing high octane number fuels in partially premixed combustion environments, results in a combustion efficiency that is higher than 98% even with 50% of EGR thus resulting in low CO and HC.

Low values of CO and $NO_x$ suggest that, irrespective of the load, the combustion takes place in the narrow temperature window of 1500 and 2000 K.

What is claimed is:

1. A fuel composition having a boiling range of between 95 to 440 degrees Fahrenheit wherein the fuel composition has (a) a total sum of n-paraffins and naphthenes content of at least 22 volume percent, wherein the naphthenes content of the total sum of n-paraffins and naphthenes content is from 5.8 vol. % to 32.2 vol. % and (b) a RON of about 85 or less, and further wherein the fuel composition is a partially premixed combustion engine fuel composition.

2. The fuel composition of claim 1 wherein the fuel composition has a total sum of n-paraffins and naphthenes content of at least 25 volume percent.

3. The fuel composition of claim 2 wherein the fuel composition has a total sum of n-paraffins and naphthenes content of at least 30 volume percent.

4. The fuel composition of claim 1, having a RON of about 80 or less.

5. The fuel composition of claim 1, wherein the partially premixed combustion engine fuel composition is a petroleum-derived, partially premixed combustion engine fuel composition.

6. The fuel composition of claim 1, having an olefin content of from 0.3 to 5.3 vol. %.

7. The fuel composition of claim 1, wherein the partially premixed combustion engine fuel composition further comprises (c) an amount of iso-paraffins which is greater than the amount of n-paraffins.

8. The fuel composition of claim 1, wherein the partially premixed combustion engine fuel composition further comprises (c) a ratio of iso-paraffins to n-paraffins of from 1.05:1 to 10.22:1.

9. The fuel composition of claim 5, wherein the petroleum-derived, partially premixed combustion engine fuel composition further comprises (c) an amount of iso-paraffins which is greater than the amount of n-paraffins.

10. The fuel composition of claim 5, wherein the petroleum-derived, partially premixed combustion engine fuel composition further comprises (c) a ratio of iso-paraffins to n-paraffins of from 1.05:1 to 10.22:1.

* * * * *